(12) United States Patent
Szilagyi et al.

(10) Patent No.: US 10,971,006 B2
(45) Date of Patent: Apr. 6, 2021

(54) TARGET VEHICLE SELECTION AND MESSAGE DELIVERY IN VEHICULAR SYSTEMS

(71) Applicant: NOKIA TECHNOLOGIES OY, Espoo (FI)

(72) Inventors: Peter Szilagyi, Budapest (HU); Csaba Vulkán, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/959,755

(22) PCT Filed: Jan. 8, 2018

(86) PCT No.: PCT/EP2018/050358
§ 371 (c)(1),
(2) Date: Jul. 2, 2020

(87) PCT Pub. No.: WO2019/134758
PCT Pub. Date: Jul. 11, 2019

(65) Prior Publication Data
US 2020/0372795 A1 Nov. 26, 2020

(51) Int. Cl.
*G08G 1/09* (2006.01)
*G08G 1/0967* (2006.01)
(Continued)

(52) U.S. Cl.
CPC ........... *G08G 1/093* (2013.01); *G08G 1/0141* (2013.01); *G08G 1/096741* (2013.01);
(Continued)

(58) Field of Classification Search
CPC ............. G08G 1/093; G08G 1/096791; G08G 1/096775; G08G 1/096741; G08G 1/0141; H04W 4/023; H04W 4/44
See application file for complete search history.

(56) References Cited

U.S. PATENT DOCUMENTS 8,330,620 B2 * 12/2012 Swoboda ............... G08G 1/162
340/902
2015/0032366 A1 * 1/2015 Man ...................... H04W 4/024
701/412
(Continued)

FOREIGN PATENT DOCUMENTS

JP        2004-54369 A     2/2004
JP        2013-150245 A    8/2013
(Continued)

OTHER PUBLICATIONS

International Search Report and Written Opinion dated Dec. 20, 2018 corresponding to International Patent Application No. PCT/EP2018/050358.
(Continued)

*Primary Examiner* — Michael J Zanelli
(74) *Attorney, Agent, or Firm* — Squire Patton Boggs (US) LLP

(57) ABSTRACT

According to an aspect, a method for selecting target vehicles for transmission by a vehicular message distribution entity is provided. Initially, map information and driving context information of a plurality of vehicles is maintained in a database of the vehicular message distribution entity in a communications system. Upon receiving from a first source vehicle a vehicular message comprising at least driving context information, the vehicular message distribution entity selects one or more vehicles in proximity of the first source vehicle from the plurality of vehicles based on geographical locations of said vehicles. Then, the vehicular message distribution entity further selects a first set of one or more target vehicles from the one or more vehicles based on driving context information and the map information. Finally, the vehicular message distribution entity causes
(Continued)

sending the vehicular message to the first set using unicast transmission.

17 Claims, 12 Drawing Sheets

(51) Int. Cl.
    *H04W 4/02*       (2018.01)
    *G08G 1/01*        (2006.01)
    *H04W 4/44*       (2018.01)

(52) U.S. Cl.
    CPC ...... *G08G 1/096775* (2013.01); *H04W 4/023* (2013.01); *H04W 4/44* (2018.02)

(56) References Cited

U.S. PATENT DOCUMENTS

| | | |
|---|---|---|
| 2016/0242223 A1 | 8/2016 | Brahmi et al. |
| 2017/0323562 A1 | 11/2017 | Rech et al. |
| 2019/0005818 A1* | 1/2019 | Altinger ................ H04W 84/18 |

FOREIGN PATENT DOCUMENTS

| | | |
|---|---|---|
| WO | WO 2017/059913 A1 | 4/2017 |
| WO | WO 2017/174339 A1 | 10/2017 |

OTHER PUBLICATIONS

PCT International Preliminary Report on Patentability dated Dec. 13, 2019 corresponding to International Patent Application No. PCT/EP2018/050358.

Japanese Office Action corresponding to JP Application No. 2020-537568, dated Jan. 26, 2021.

* cited by examiner

Source vehicle heading East

Source vehicle heading West

1040 Source vehicle originating the message
1050 Target vehicle considered for receiving the message
1060 Vehicle not receiving the message (removed by the filter)

Source vehicle heading East

Source vehicle heading West

1040 — Source vehicle originating the message
1050 — Target vehicle considered for receiving the message
1060 — Vehicle not receiving the message (removed by the filter)

Source vehicle heading East

Source vehicle heading West

1040 — Source vehicle originating the message
1050 — Target vehicle considered for receiving the message
1060 — Vehicle not receiving the message (removed by the filter)

Source vehicle heading East

Source vehicle heading West

1040 Source vehicle originating the message
1050 Target vehicle considered for receiving the message
1060 Vehicle not receiving the message (removed by the filter)

TARGET VEHICLE SELECTION AND MESSAGE DELIVERY IN VEHICULAR SYSTEMS

FIELD OF THE INVENTION

The exemplary and non-limiting embodiments of this invention relate generally to wireless communications in vehicular applications, and more particularly to wireless communications between a source vehicle and multiple target vehicles.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Wireless communication between vehicles and vehicles and infrastructure enables various connected car use cases, such as disseminating situation awareness messages for assisted driving, sending emergency alerts to increase safety and executing cooperative maneuvers such as lane merging or platooning. Vehicular connectivity over 3GPP cellular technology, often abbreviated as C-V2X, is being standardized starting with LTE-A and its evolution into 5G. One of the goals of the standardization effort is to integrate vehicular communication into the well-established 3GPP radio access networks. However, several challenges exist currently in arranging the C-V2X communication in a manner which would be both efficient and reliable.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, apparatuses, and a computer program product as defined in the independent claims. Further embodiments of the invention are disclosed in the dependent claims.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
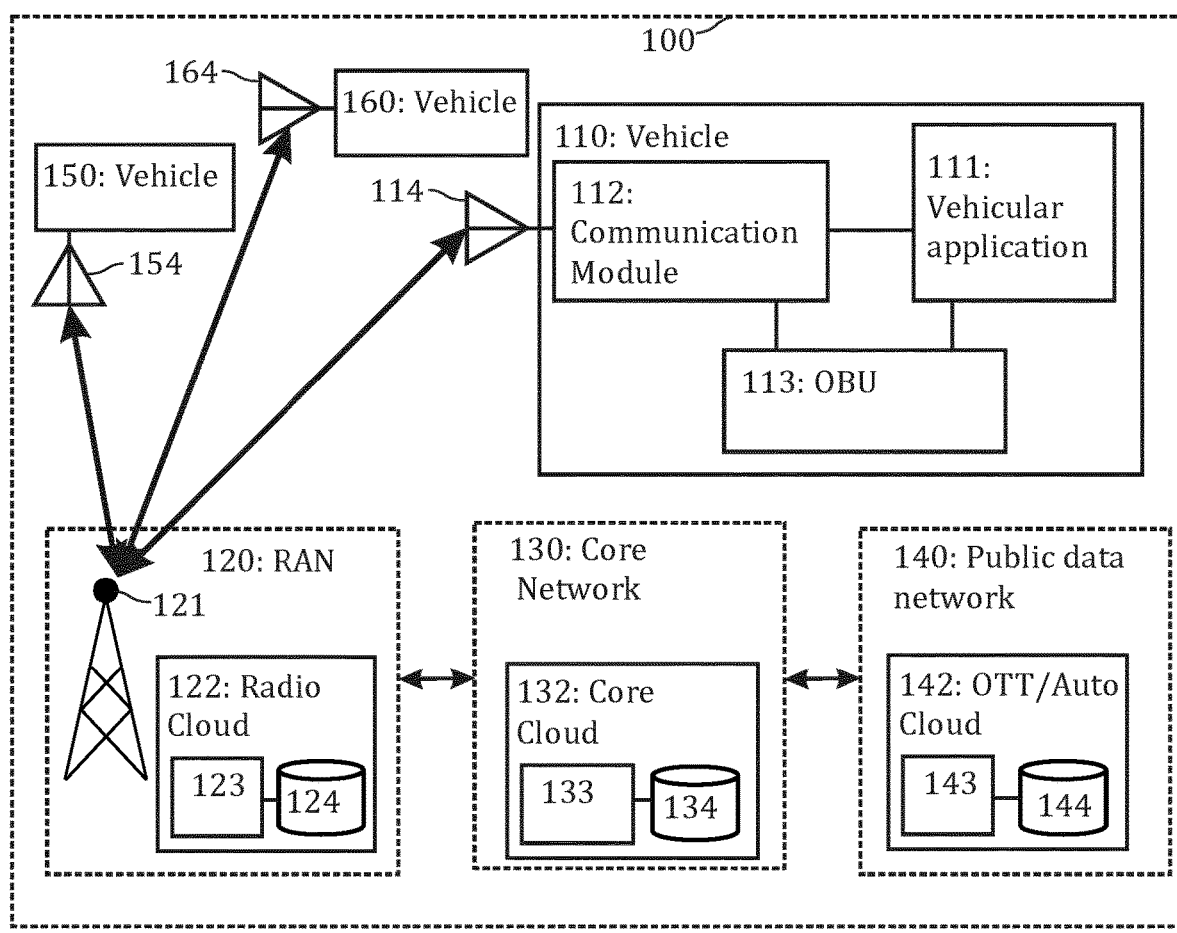
FIG. 1 illustrates an example of a communications system to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments described may be implemented in any communications system, such as in at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunications System (UMTS, 3G) based on basic wide-band-code division multiple access (W-CDMA), high-speed packet access (HSPA), Long Term Evolution (LTE), LTE-Advanced (LTE-A), New Radio (NR), a system based on IEEE 802.11 specifications, a system based on IEEE 802.11p/Intelligent Transport Systems G5 (ITS-G5)/Dedicated Short Range Communications (DSRC) specifications, a system based on IEEE 802.15 specifications, and/or a fifth generation (5G), or beyond, mobile or cellular communications system.

The embodiments are not, however, restricted to the system given as an example but a person skilled in the art may apply the solution to other communications systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (for example IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise, in addition to standard high-volume servers, switches and storage devices, one or more virtual machines running computer program codes using standard or general type servers instead of customized hardware. Cloud computing or cloud data storage may also be utilized. In radio communications, this may mean that node operations are carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

The present invention relates to vehicle communication or particularly to vehicle-to-everything (V2X) communication. V2X communication refers to delivering information from a vehicle to any entity that may affect the vehicle and vice versa. V2X communication may comprise a multitude of more specific types of communication such as V2I (Vehicle-to-Infrastructure), V2V (Vehicle-to-Vehicle), V2P (Vehicle-to-Pedestrian), V2D (Vehicle-to-Device) and V2G (Vehicle-to-Grid). In the context of vehicular connectivity over 3GPP cellular technology, as envisioned to be used also with 5G, V2X communication is termed as cellular vehicle-to-everything (C-V2X) communication. In contrast to the earlier WiFi-based dedicated short-range communications (DSRC) which primarily uses V2V broadcasting, C-V2X message delivery in its current form builds on the traditional cellular uplink/downlink transmission via the Uu radio interface with the true V2V capabilities being still in development as of 2017. Thus, a V2I/I2V pattern (i.e., uplink and downlink instead of direct V2V side-links) are used to convey V2X messages from one vehicle to another through the network infrastructure.

FIG. 1 illustrates an example of a communications system 100 to which embodiments of the invention may be applied. FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The communications system 100 comprises one or more vehicles 110, 150, 160 configured for C-V2X communication (or other similar type of communication for corresponding cellular technology) as described in above. Each of the one or more vehicles 110, 150, 160 may be able to connect to an access node 121 of a radio access network 120 (e.g., an Evolved Node B, eNB, of an Evolved UMTS Terrestrial Radio Access Network, E-UTRAN, or gNode B, gNB, of a 5G radio access network). Different vehicles 110, 150, 160 may connect to the same access node 121 of the same radio access network 120 (as illustrated in FIG. 1 for simplicity) or to different access nodes of same or different radio access networks. Each radio access network 120 may provide a connection to a core network 130 which in turn may provide connection one or more public data networks 140 (e.g., the Internet).

For enabling V2X communication, each of the one or more vehicles 110, 150, 160 may comprise at least a vehicular application 111 (or a vehicular application entity), an on-board unit (OBU) 113 and a communication module 112 (shown for simplicity only for vehicle 110) which may be connected to each other for sharing information/signals. Each of the one or more vehicles 110, 150, 160 may further comprise an antenna 114, 154, 164. The vehicular application 111 (e.g., a V2X Application as defined by 3GPP) may be used to originate (generate) and receive via the communication module 112 vehicular messages. The on-board unit 113 is a computing device which may be used at least for collecting positioning data using a Global Position System (GPS) sensor and possibly other sensor data relating to the vehicle. The collected sensor data may comprise one or more of the following properties of the vehicle: location, speed, heading (i.e., direction/orientation), acceleration, mobility and potential trajectory. Said collected sensor data may be available to the vehicular application 111 and may be comprised in the vehicular messages generated by the vehicular application. The communication module 112 in connection with an antenna 114 may be used to transmit the vehicular messages originated by the vehicular application wirelessly as radio signals to access nodes 121 and conversely receive any radio signal transmitted by access nodes 121 and provide the received to the on-board unit 113 and/or the vehicular application 111.

The communications system 100 comprises a vehicular message distribution entity for handling (i.e., receiving, analyzing and delivering) vehicular messages sent by the one or more vehicles 110, 150, 160 to the access nodes 121. The vehicular message distribution entity may be a software function or an application deployed in one of three alternative elements. According to a first option, the vehicular message distribution entity may be deployed as a physical or virtual network function 123 in a radio cloud 122 of a radio access network 120, e.g., attached to or being part of the LTE eNB or 5G gNB or running on top of an edge cloud platform such as the Multi-access Edge Computing (MEC) using virtual machine or container technology. An edge cloud is a cloud utilizing the logical extremes (edges) of a network, thus being closer to the source of the information (e.g., IoT sensors) than conventional cloud solutions. According to a second option, the vehicular message distribution entity may be deployed in a central or core cloud 132 of the core network 130 as element 133. According to a third option, the vehicular message distribution entity may be deployed as an over-the-top (OTT) application 143 in a cloud 142 or specifically an OTT cloud 142 (e.g., an Auto Cloud) of the public data network 140 (e.g., the Internet) as element 143. An OTT application is an application providing content to users over the Internet using the (OTT) cloud without the involvement of a multiple-system operator (MSO) in the control or distribution of the content. The Internet provider may be aware of the contents of the Internet Protocol (IP) packets but is not responsible for, nor able to control, the viewing abilities, copyrights, and/or other redistribution of the content. In other words, OTT refers to content from a third party that is delivered to an end-user, with the Internet service provider simply transporting IP packets.

The vehicular message distribution entity may be configured to collect (receive) vehicular messages from the one or more vehicles 110, 150, 160 (source vehicles) and cause sending said vehicular messages forward to at least one vehicle (target vehicles) selected from one or more vehicles 110, 150, 160 according to embodiments to be described in detail above. The transmission may be unicast transmission, that is, a unique copy of the same vehicular message may be transmitted to each target vehicle with different channel coding that protects the transmission over the radio interface against the particular conditions of the radio link of the target vehicle. The link adaptation capability ensures maximum resiliency (correct message decoding capability), which may be further increased by fast selective retransmissions (HARQ with incremental redundancy). Consequently, due to transmitting different copies of the same vehicular message to each target vehicle over disjoint radio resource blocks, unicast allocates resources proportional to the number of target vehicles; i.e., the more the target vehicles, the higher the resource consumption. Therefore, transmission of vehicular messages to target vehicles which attain very little benefit from said vehicular messages should be avoided in order not to consume resources in vain. Unnecessary messages would also consume resources at the target vehicles that would still receive and process them only to eventually discard their contents.

The vehicular message distribution entity 123 or 133 or 143 may maintain one or more databases 124 or 134 or 144 in order to store information comprised in vehicular messages and received from auxiliary sources as well as to store information derived from them through its own analytics. Each alternative element 124, 134, 144 may comprise one or more databases.

The vehicular message distribution entity may further maintain in the one or more databases 124 or 134 or 144 driving context information of a plurality of vehicles. The driving context information for each vehicle may comprise up-to-date information on, for example, the location, speed, heading and/or acceleration. The driving context information of each vehicle may enable the calculation of a short-term trajectory of said vehicle. The vehicular message distribution entity may receive the driving context information in the vehicular messages (e.g., Cooperative Awareness Message, CAM, or Decentralized Environmental Notification Message, DENM) sent by the plurality of vehicles, message delivery of which the vehicular message distribution entity manages. The vehicular messages may be transmitted to the vehicular message distribution entity periodically (e.g., with 10 Hz frequency). In some cases, the driving context information may also comprise information on events like emergency braking and/or may be related to Cooperative Adaptive Cruise Control (CACC), i.e., autonomous function to maintain a fixed distance between following cars, or platoon management. In some embodiments, the vehicular message distribution entity may further maintain in the one or more database other information transmitted by the plurality of vehicles such as information produced by on-board sensors (in raw or processed format), camera video streams (e.g., for V2X use cases like see-through), radar or lidar scans or their pre-processed information (such as the detected presence of pedestrians or other Vulnerable Road Users, VRUs).

The vehicular message distribution entity may maintain in the one or more databases 124 or 134 or 144 up-to-date map information. Said map information may comprise high precision mapping information including, for example, detailed metadata of the roads, lanes, junctions, buildings, road works, potential trajectories, parking possibilities, tunnels, existing blockages, possible connections or junctions (crossing on the same level or one arching over the other without joining), road attributes such as lane structure and whether traffic directions are physically separated, and/or pedestrian crossings. The main function of the map information in terms of the vehicular message distribution entity is to enable putting vehicles into context with each other and with their environment (e.g., to evaluate whether vehicles may physically come in contact staying on their current road and maintaining their current trajectory).

In some embodiments, the vehicular message distribution entity may maintain in the one or more databases 124 or 134 or 144 auxiliary information such as real-time sensor information. The sensor information may be collected from IoT networks such as ones implemented in smart cities that connect various sensors together into a platform that provides access to the sensor and other information to other entities. The sensor information may comprise up-to-date information collected from one or more sensors (e.g., road traffic sensors, smart city sensors and/or street cameras) about the traffic situation, road elements that schedule or otherwise impact the vehicular traffic flow (e.g., traffic light states), congestion, weather sensors (e.g., temperature, humidity, dew point, visibility), weather forecast entity (using, e.g., aforementioned weather sensors or public or private local weather data) parking occupation and/or unusual events such as accidents or blockings. To give another example of auxiliary information which may be maintained in the one or more databases 124 or 134 or 144, network elements (e.g., operations support systems, OSS, and/or gateways, GWs) may provide information about radio connections or data bearers established in the network for non-V2X purposes (e.g., mobile broadband, MBB) that may reveal the presence of VRUs or other road participants (passengers, non-connected vehicles) that are relevant for the driving context and environment of a given vehicle.

The auxiliary sensor information may be collected from IoT networks such as ones implemented in smart cities that connect various sensors together into a platform that provides access to the sensor and other information to other entities. The auxiliary information, if available, is combined with the information present in the vehicular messages and with map data in order to build a full state of the traffic/road condition (e.g., in a supervised area such as a city district) and to enable analyzing the relative context of the vehicles in details. The relative context of vehicles may include (but is not limited to) comparing their type (e.g., truck vs. passenger car), speed, acceleration/braking events, heading angle/orientation, presence in a CACC control loop or platoon, presence in specific lanes, relation to traffic light (e.g., waiting in front of red light), being queued up due to traffic light or congestion, planned route/trajectory (navigation information), presence of other vehicles in the vicinity/line of sight/presence of the two vehicles, presence of other road users (e.g., VRU, passengers, cyclists), etc. The relative context of vehicles is used to evaluate whether a vehicular message (e.g., CAM, DENM) originated by a given source vehicle should be delivered to a given (potential) target vehicle. The type of the message and the importance of the information it carries from the potential receiver's point of view is also taken into account. The evaluation considers if the target vehicle's driving condition may be affected by the source vehicle's presence or maneuvering (e.g., a vehicle following another vehicle is affected by what the front vehicle is doing whereas two vehicles moving in the opposite direction on different lanes or streets are not affected by each other even if their physical line-of-sight distance is considered short) or by the information delivered by the source vehicle. The information that the source vehicle may potentially transmit and what may be of interest for the target vehicles includes not only the standardized CAM/DENM messages but also the information produced by on-board sensors (in raw or processed format), camera video streams (e.g., for V2X use cases like see-through), radar, lidar, etc. scans or their pre-processed information (such as the detected presence of pedestrians or other VRUs) or navigational updates on expected future maneuvers (such as turns or lane changes to follow a planned route). After considering the potential target vehicles from the above point of view, the vehicular message distribution entity delivers each vehicular message to those target vehicles that are affected by the source vehicle that originated the message or would require updated information from said source vehicle.

The map information and the sensor information may be considered generic information that is relevant to all vehicles present in the area. In some embodiments, the vehicular message distribution entity may further maintain in the one or more databases 124 or 134 or 144 more specific road/traffic context information. The road/traffic context information may comprise information on a per vehicle basis, derived from the map information and the sensor information correlated with the information collected from the vehicular messages of each individual vehicle. The road/traffic context information may comprise the latest kinematics information of the vehicle (available from the vehicular messages, e.g., location, speed, acceleration and/or heading angle parameters and values) as well as their interpretation in the context of the road environment, weather conditions and other vehicles (the relative context of the vehicle). The relative context of each vehicle may include (but is not limited to) comparing their type (e.g., truck vs. passenger car), speed, acceleration/braking events, heading angle/orientation, presence in a CACC control loop or platoon, presence in specific lanes, relation to traffic light (e.g., waiting in front of red light), being queued up due to traffic light or congestion, planned route/trajectory (navigation information), presence of other vehicles in the vicinity/line of sight/presence of the two vehicles, and/or presence of other road users (e.g., VRU, passengers, cyclists). The road/traffic context information relating to a given vehicle may be updated every time when a new vehicular message is received from the vehicle (more frequent event) and/or when there is a change in the environment detected through changes to the map and/or sensor information maintained in the one or more databases 124 or 134 or 144 (less frequent event).

The relative context of vehicles may be used according to some embodiments to evaluate whether a vehicular message (e.g., CAM, DENM) originated by a given source vehicle should be delivered to a given (potential) target vehicle. The type of the message and the importance of the information it carries from the potential receiver's point of view may also be taken into account. The evaluation may consider if the target vehicle's driving condition may be affected by the source vehicle's presence or maneuvering (e.g., a vehicle following another vehicle is affected by that the front vehicle is doing whereas two vehicles moving in the opposite direction on different lanes or streets are not affected by each other) or by the information delivered by the source vehicle. This evaluation is described in more detail in connection with further embodiments.

In some embodiments, the one or more databases 124 or 134 or 144 maintained by the vehicular message distribution entity may comprise for each source/target vehicle pair pair-wise message history, that is, at least the latest information sent to the target vehicle about the source vehicle and the time of the latest message transfer. In other words, the one or more databases 124 or 134 or 144 may comprise information for keeping track of the target vehicle's knowledge about the source vehicle and the age of the knowledge for each combination of source/target vehicle pairs where vehicular message transfer has already happened. Said information may be updated every time the vehicular message distribution entity sends a message from a source vehicle to the target vehicle.

In some embodiments, different types of information (i.e., the map information, the sensor information, the road/traffic context information and pair-wise message history) may be maintained in different databases.

Figure 2:
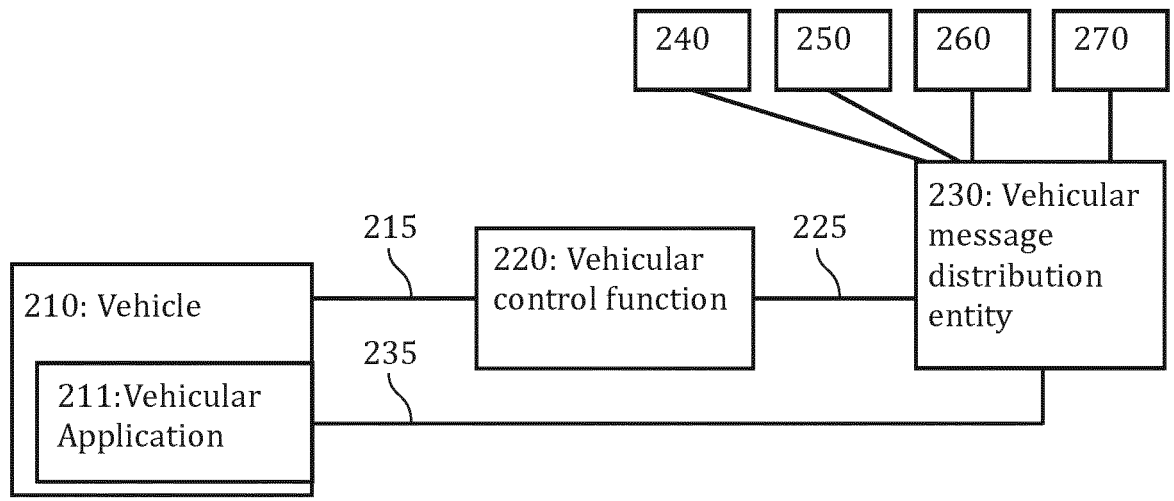
FIGS. 2 to 9 illustrate examples of processes according to embodiments of the invention.

The interfaces for realizing at least some of the functionalities discussed in relation to FIG. 1 according to some embodiments are illustrated in FIG. 2 for a single vehicle 210 with a vehicular application 211 and a vehicular message distribution entity 230. The vehicular application 211 may be a V2X Application as defined by 3GPP, possibly with added functionalities as defined by the following embodiments. In the illustrated example, the interfaces 215, 225, 235 may be standard interfaces V3, V2 and V1 as specified by 3GPP, respectively. However, the interfaces 215, 225, 235 used for transferring messages between the vehicle 210 and the vehicular message distribution entity 230 do not bring any intelligence in how the message distribution is to be provided. Thus, they may be regarded as basic connectivity enables to facilitate message transmission. Additionally (not mentioned or defined by 3GPP), the vehicular message distribution entity 230 may interface with other elements 240, 250, 260, 270. Said other elements 240, 250, 260 270 may comprise additional network elements (such as the SGW/PGW in LTE EPC, or 5G core network functions, referred to as GW) to access information about data bearers (including V2X as well as traditional Internet/mobile broadband or telco voice connections), IoT platforms (such as Nokia IMPACT) to collect information and data from sensors, vehicles (in addition to the vehicular messages), road infrastructure, OSS and network databases to collect key performance indicators (KPIs) and measurements about network performance and traffic flows and OTT/Auto Clouds to obtain information such as maps or car manufacturer specific vehicular data. The vehicular control function 220 may be a V2X Control Function as defined by 3GPP, that is, it may be a logical function used for network related actions required for V2X communication. Namely, the vehicular control function may be used to provision user equipment (e.g., V2X-enabled vehicles equipped with V2X applications) with necessary parameters in order to use V2X communication. It may be further used to provision said user equipment with public land mobile network (PLMN) specific parameters that allow the user equipment to use V2X communication in this specific with public land mobile network.

Figure 3:
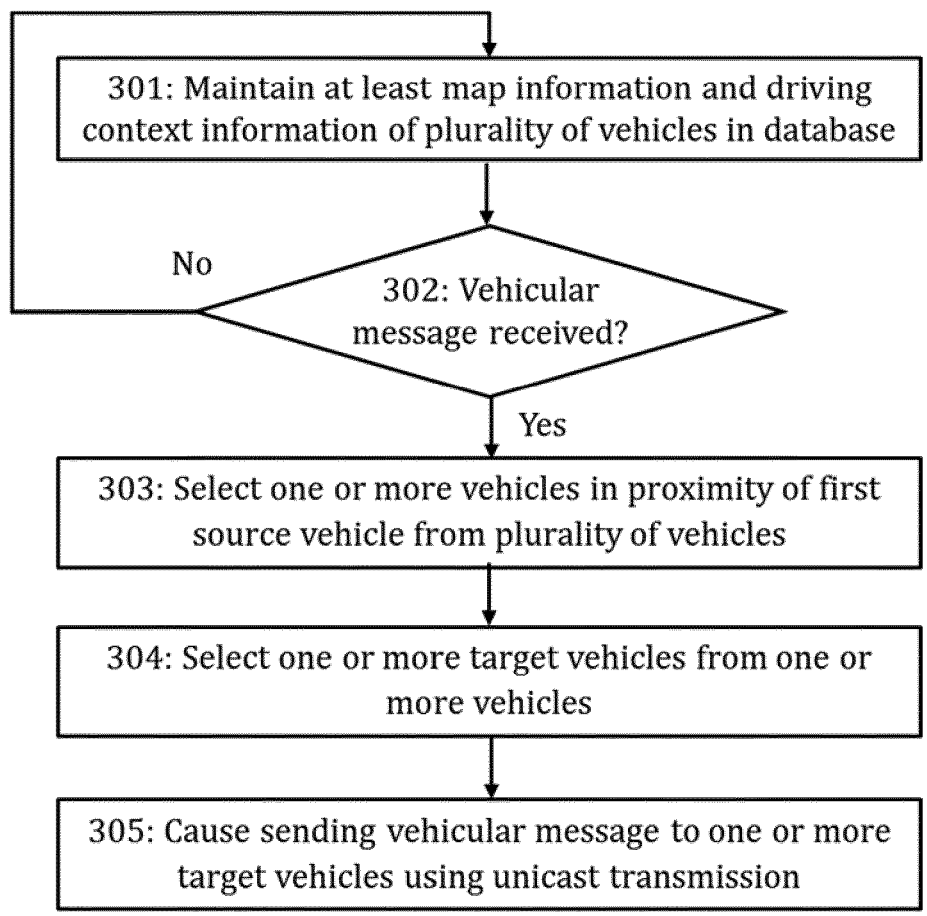

FIG. 3 illustrates a process executed by the vehicular message distribution entity in a communications system for selecting one or more target vehicles to which a vehicular message received from a first source vehicle is transmitted according to an embodiment of the invention.

Referring to FIG. 3, the vehicular message distribution entity maintains, in block 301, in a database at least map information and driving context information of a plurality of vehicles. The driving context information of each vehicle may comprise at least information for determining a geographical location and a short-term trajectory of said vehicle so that the relative motion of vehicles in respect to each other may be evaluated. The vehicular message distribution entity receives, in block 302, a vehicular message from a first source vehicle. The vehicular message may comprise at least driving context information of the first source vehicle. The vehicular message distribution entity selects, in block 303, one or more target vehicles in proximity of the first source vehicle from the plurality of vehicles based at least on geographical locations (comprised in driving context information) of the first source vehicle and the plurality of vehicles. In some embodiments, the one or more target vehicles may be selected from the plurality of vehicles using the driving context information based on a geographical area (or simply geo-area) surrounding a location of the first source vehicle. The geographical area may be defined simply by, for example, a circle, a rectangle or an ellipsoid having an origin or a center in the location of the first source vehicle. In some embodiments, the geographical area may also be defined asymmetrically in respect to the first source vehicle, for example, based on the heading direction of the first source vehicle. The vehicular message distribution entity selects, in block 304, a first set of one or more target vehicles from the one or more target vehicles based on the driving context information of the first source vehicle, driving context information of the one or more target vehicles and the map information. The first set of one or more target vehicles may be selected so as to choose only those vehicles for which the vehicular message from the first source vehicle likely has high relevance. For example, before the selecting it may be evaluated if the first source vehicle and the one or more relevant target vehicles are stationary or moving and if they are moving (or one of them is moving), whether they are travelling on trajectories that may collide in the near future (e.g., moving towards each other) or not (e.g., getting away in the opposite direction). This mutual motion context may form the basis for the selection so that the vehicular message is not sent to vehicles whose physical presence and short-term future trajectories are not related to the physical presence and short-term future trajectory of the first source vehicle despite being located close to the first source vehicle at the moment of the evaluation. Further, the map information may be used to determine, for example, whether the first source vehicle and the one or more target vehicles are located in the same street/road and/or in the same lane of the same street and whether the lanes are physically separated (removing the chance of contact between vehicles driving in opposite directions). Finally, the vehicular message distribution entity causes, in block 305, sending the vehicular message (or one or more copies of the vehicular message) to the one or more target vehicles using unicast transmission.

Figure 4:
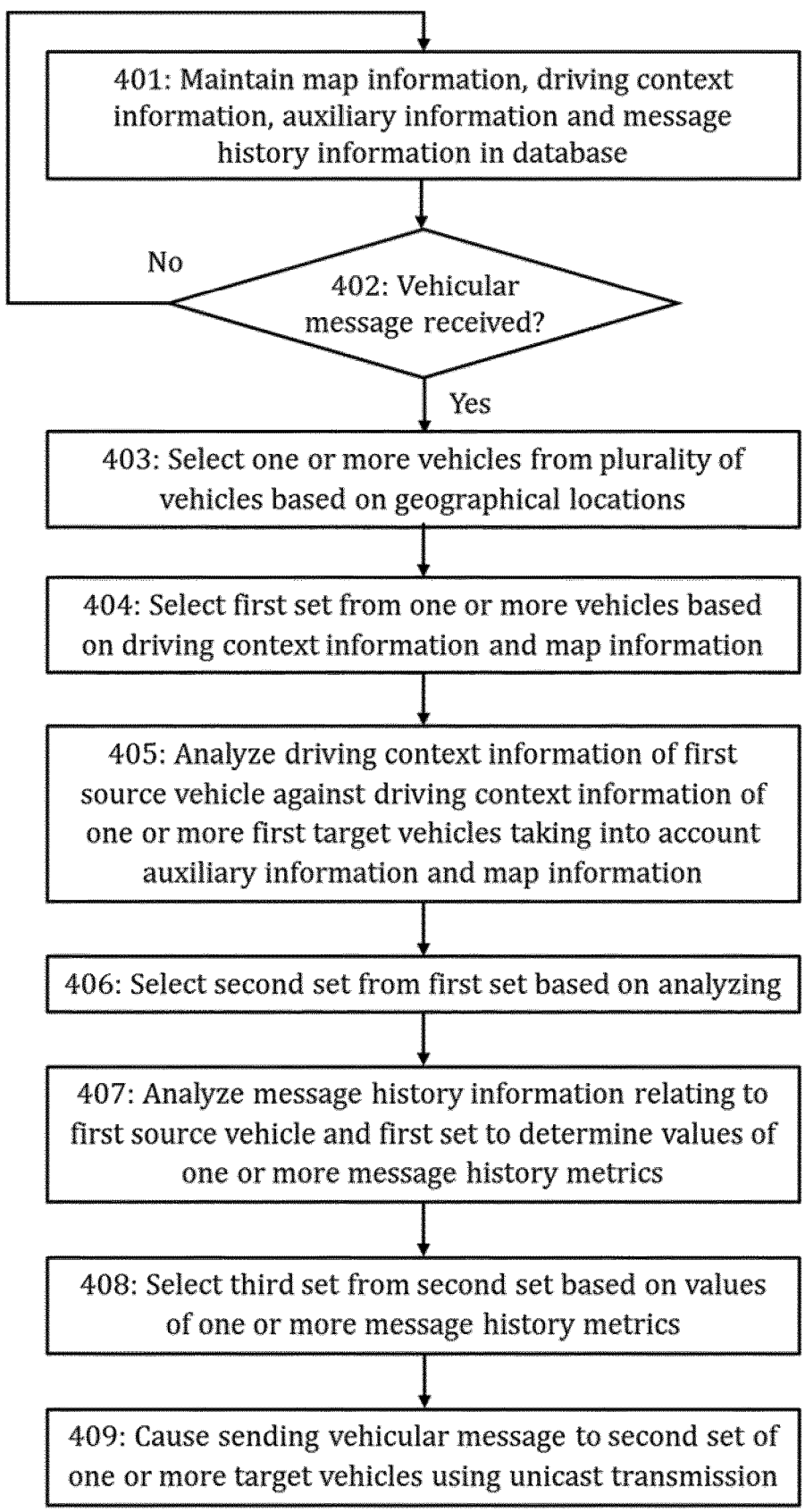

The embodiment discussed in relation to FIG. 3 provides a considerable improvement over purely geo-area-based methods. The result may be further improved by taking into account in the analysis for selecting the target vehicles in block 304 of FIG. 3 information derived from auxiliary sources and/or message history information as discussed above. FIG. 4 illustrates another, more involved process executed by the vehicular message distribution entity in a communications system for selecting one or more target vehicles taking into account said additional information according to an embodiment of the invention.

Referring to FIG. 4, the vehicular message distribution entity maintains, in block 401, map information and driving context information of a plurality of vehicles (similar to embodiment of FIG. 3) as well as auxiliary information and message history information for each vehicle pair formed by a source vehicle and a target vehicle. The auxiliary information may be information received from one or more sources of one or more of the following types: smart city infrastructure sensor, an Internet of Things network, a mobile broadband traffic of a vehicular user, a weather sensor or station, a road sensor and a road camera. The auxiliary information may comprise any auxiliary information as discussed in relation to FIG. 1. Similarly, the message history information may be defined as described in relation to FIG. 1. Blocks 402 to 404 may be similar to blocks 302 to 304 of FIG. 3 and will therefore not be repeated here for brevity.

After the first set has been selected based on mutual motion context of the one or more vehicles (block 404), the vehicular message distribution entity analyzes, in block 405, the driving context information of the first source vehicle against driving context information of one or more target vehicles taking into account auxiliary information relating to the first source vehicle and the one or more first target vehicles and the map information. In other words, the vehicular message distribution entity performs correlative analysis on the driving context information, the auxiliary information and the map information maintained in the database. For example, the vehicular message distribution entity may use in said analysis behavioral and intent information (e.g., results from previous analysis used in the selecting in block 403), real-time traffic situation (e.g., assessed using smart city, IoT or road sensors) and/or street/road information maintained in one or more databases. Based on the analyzing, the vehicular message distribution entity selects, in block 406, a second set of one or more target vehicles (i.e., a subset) from the first set of one or more target vehicles. The vehicular message distribution entity may include in the second set all the target vehicles of the first set for which the auxiliary information based analysis reveals no reason for exclusion. The reason for exclusion may be that there is no meaningful connection between the first source vehicle and the target vehicle. The vehicular message distribution entity analyzes, in block 407, message history information relating to the first source vehicle and the second set of one or more target vehicles to determine values of one or more message history metrics. The one or more message history metrics may quantify, for example, the amount of new information carried in the vehicular message for a target vehicle (compared to a previously transmitted vehicular message) and/or significance of said information for said target vehicle. Based on the values of the one or more message history metrics, the vehicular message distribution entity selects, in block 408, a third set of one or more target vehicles from the second set based on the values of the one or more message history metrics. The selecting may be performed, for example, based on one or more pre-defined thresholds for the one or more message history metrics. The vehicular message distribution entity causes, in block 409, sending the vehicular message to the one or more target vehicles using unicast transmission. A separate copy of the vehicular message for each target vehicle in the third set may be created and said copy may be transferred toward a radio access node for further transmission to the target vehicle.

In some embodiments, the vehicular message distribution entity may, upon receiving the vehicular message, store the vehicular message and/or a timestamp for when the vehicular message was received to the database. The storing may be performed also in conjunction with the embodiment of FIG. 3. Moreover, the vehicular message distribution entity may, in response to the analyzing in block 405, store results of the analyzing to the database.

Block 404, blocks 405, 406 and blocks 407, 408 may be considered as three filtering procedures applied to the initial the one or more vehicles chosen based on a geographical area around the first target vehicle, namely filtering based on mobility analytics, filtering based on correlation of vehicular message content and auxiliary information and filtering based on vehicular message history or importance analytics based on message history information, respectively. In some embodiments, the one or more vehicles may be filtered using only one or two of said three filtering procedures. Moreover, the order in which the one or more vehicles chosen based on a geo-area are filtered may differ from the one illustrated in FIG. 4 in some embodiments.

In some embodiments, block 304 of FIG. 3 may comprise one or more of the aforementioned three filtering procedures (filtering based on mobility analytics, filtering based on correlation of vehicular message content and auxiliary information and filtering based on vehicular message history or importance analytics based on message history information). Necessary data for corresponding filtering procedures (as specified in relation to FIG. 4) may be maintained in the database in block 301 of FIG. 3 in said embodiments.

Figure 5:
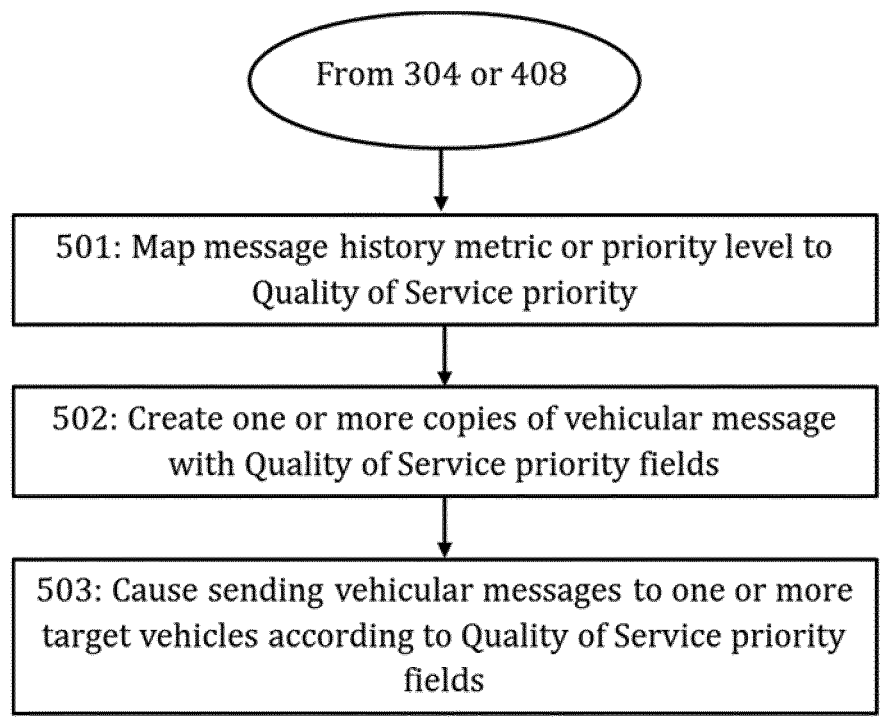

In some embodiments, in addition to filtering the set of target vehicles to transmit the vehicular only to the most important target vehicles, the transmission may be prioritized in different ways for different vehicular messages. Specifically, one of two alternative prioritization schemes may be applied. Both of said schemes may be illustrated with the process of FIG. 5.

In the first alternative prioritization scheme, it is assumed that the vehicular message distribution entity has performed at least filtering based on vehicular message history or importance analytics (i.e., blocks 407, 408 of FIG. 4). Thus, one or more message history metrics are defined and values for each relevant first source vehicle-target vehicle pair have been determined. After said filtering, the vehicular message distribution entity maps, in block 501, a message history metric (acting here as a priority metric) of the one or more message history metrics to a Quality of Service priority for the vehicular message. In some embodiments, a more complicated mapping of the one or more message history metrics to the Quality of Service priority may be employed. The vehicular message distribution entity creates, in block 502, one or more copies of the vehicular message. Each copy may comprise information on the Quality of Service priority for a corresponding target vehicle as a Quality of Service priority field in a protocol data unit used for transferring vehicular messages. One option of achieving this is using the Internet Protocol (IP) layer's differentiated services code point (DSCP) field, that is processed by relevant QoS enforcement functions in the system (e.g., transport routers, or RAN elements mapping from DSCP to radio scheduler weights). Alternatively, depending on the deployment of the vehicular message distribution entity, the QoS differentiation capabilities of the data transfer interfaces present at its location may be utilized (e.g., if the underlying protocols enable to mark the packets according to QoS priority, the marking may be utilized, or if an urgency bit is available, it can be set for selected vehicular messages). This may concern existing interfaces/stacks (such as the LTE 51 protocol stack using General packet radio service Tunneling Protocol (GPRS Tunneling Protocol, GTP) or IP tunneling with the outer IP DSCP being indicative of the PDU priority) or future interfaces (such as the 5G U-plane N3 or NG-U interface). The vehicular message distribution entity causes, in block 503, sending the one or more copies of the vehicular message to the one or more selected target vehicles in the third set using unicast transmission according to Quality of Service priority fields of the one or more copies of the vehicular message and other vehicular messages waiting to be sent.

In the first alternative prioritization scheme, no modification was required for the vehicle message format or the vehicular (V2X) application. In the second alternative prioritization scheme, the vehicular message format is extended with a new information element to provide priority/urgency information about the message itself directly in the vehicular (V2X) application layer protocol headers, e.g., in the CAM PDU as part of the Intelligent Transport Systems (ITS) PDU header or part of the information in one of the containers (e.g., basic or high frequency). It should be emphasized that the priority described here concerns the message (e.g., Quality of Service priority) and not the priority of the vehicle (e.g., emergency vehicle requesting priority on the road, which is an existing information element). The information element may be specified, for example, as an 8 bit integer field enabling differentiating between 255 priority levels.

As mentioned above, FIG. 5 may illustrate also the second alternative prioritization scheme. In this case, one or more of the three filtering procedures (i.e., block 404 and/or blocks 405, 406 and/or blocks 407, 408 of FIG. 4) may have been performed before block 501 is performed to reduce the number of target vehicles from one or more vehicles selected based on a geographical area. Moreover, it is assumed that the received vehicular message is a vehicular message with the modified format as described in the previous paragraph and comprises information on a priority level of the vehicular message defined by the vehicular application. After said filtering, the vehicular message distribution entity maps, in block 501, said priority level comprised in the vehicular message to a Quality of Service priority and creates, in block 502, one or more copies of the vehicular message. Again, each copy may comprise information on the Quality of Service priority as a Quality of Service priority field in a protocol data unit used for transferring vehicular messages. However, it should be noted that as, in this case, the Quality of Service priority is effectively defined by the vehicular application of the source vehicle for the vehicular message (i.e., not for particular transmission of the said vehicular message to a certain target vehicle), it is the same for all the target vehicles. Finally, the vehicular message distribution entity causes, in block 503, sending the one or more copies of the vehicular message to the one or more selected target vehicles in the corresponding set of one or more target vehicles (i.e., a first/second/third set depending on the performed filtering) using unicast transmission according to Quality of Service priority fields of one or more copies of the vehicular message and other vehicular messages waiting to be sent.

In addition to the priority indication added to the vehicular messages, the user equipment (UE) or vehicle side vehicular (V2X) application (i.e., element 111 of FIG. 1 and/or element 211 of FIG. 2) also needs to be modified to fill the priority indication in each message it has generated with the right information. The priority at the UE side may be based on the vehicular (V2X) use case and/or traffic situation in which the vehicle originating the message operates. For example, vehicular messages in relation to emergency situations (urgency) or latency sensitive use cases (maintaining platooning membership or exercising CACC control) may be set to higher priority than good to know and frequently originated status updates about the position and speed of the vehicle. If no priority is required for the message, the UE may use a default priority indication that may be encoded with a particular priority value (e.g., integer 0) in the vehicular message or by the lack of the priority field in the message (which has the advantage of backward compatibility with the current message format). The use cases may, for example, correspond to or comprise V2X use cases as defined by 3GPP such as maintaining platooning, remote driving, automated cooperative driving for short distance grouping, cooperative collision avoidance (CoCA) of connected automated vehicles, collective perception of environment, information sharing for partial/conditional and high/full automated platooning and video data sharing for assisted and improved automated driving (VaD) and/or emergency trajectory alignment.

Figure 6:
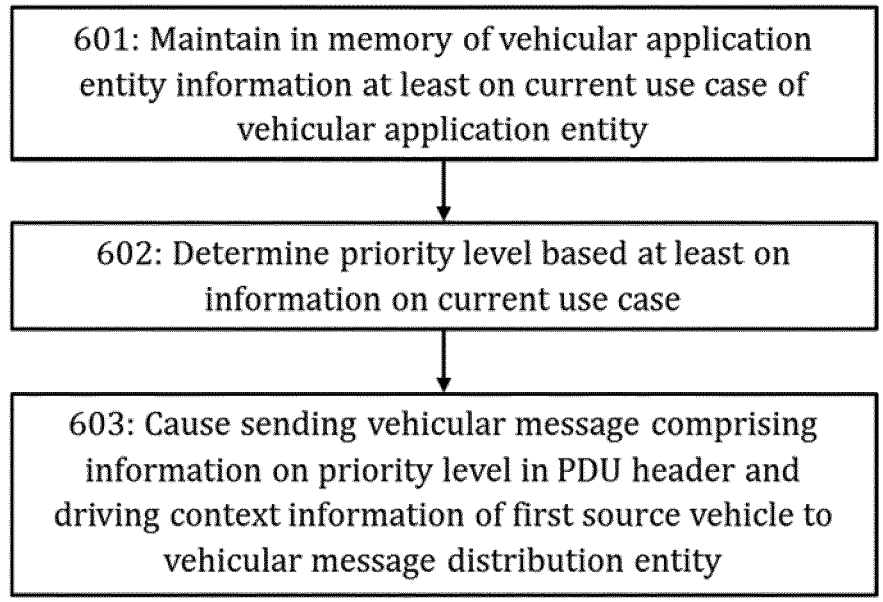

An exemplary process according to an embodiment for transmitting a vehicular message by a vehicular application entity (i.e., a vehicular application or an entity running a vehicular application) is illustrated in FIG. 6.

Referring to FIG. 6, the vehicular application entity maintains, 601, in a memory of the vehicular application entity of a first source vehicle in a communications system at least information on a current use case of the vehicular application entity for vehicular communication. Moreover, the vehicular application entity may also maintain information on current traffic situation concerning the vehicular application entity (i.e., the first source vehicle). The vehicular application entity determines, in block 602, a priority level for vehicular communication based at least on the information on the current use case. In some embodiments, information on the current traffic situation may be used in said determining in addition to or instead of the information on the current use case. The vehicular application entity causes, in block 603, sending a vehicular message comprising information on the priority level comprised in a header of a protocol data unit of the vehicular message and driving context information of the first source vehicle to a vehicular message distribution entity for further transmission to one or more target vehicles. The driving context information may comprise at least information for determining a geographical location and a short-term trajectory of the first source vehicle (similar to earlier definition of said term). In some embodiments, a specific event may have originated/triggered the process of FIG. 6. Information on said event may be used in the determining in block 602 in addition to or instead of the information on the current use case and/or the current traffic situation.

In the following, examples according to embodiments are provided for how the selection of the target vehicles (or conversely filtering of the target vehicles) after the initial selection based on a geographical may be arranged. The three different filtering procedures (mobility analytics, correlation using auxiliary information and vehicular message priority or importance analytics) as previously mentioned are discussed separately in FIGS. 7 to 9. It should be emphasized that the individual filtering operations illustrated in blocks of FIGS. 7 to 9 may be performed in any order and that in some embodiments one or more of said filtering operations may be omitted. Moreover, while in the following it is assumed that all three of the aforementioned filtering procedures are carried out in the order described in FIG. 4, the order may differ and/or some of said filtering procedures may be omitted in some embodiments.

Figure 7:
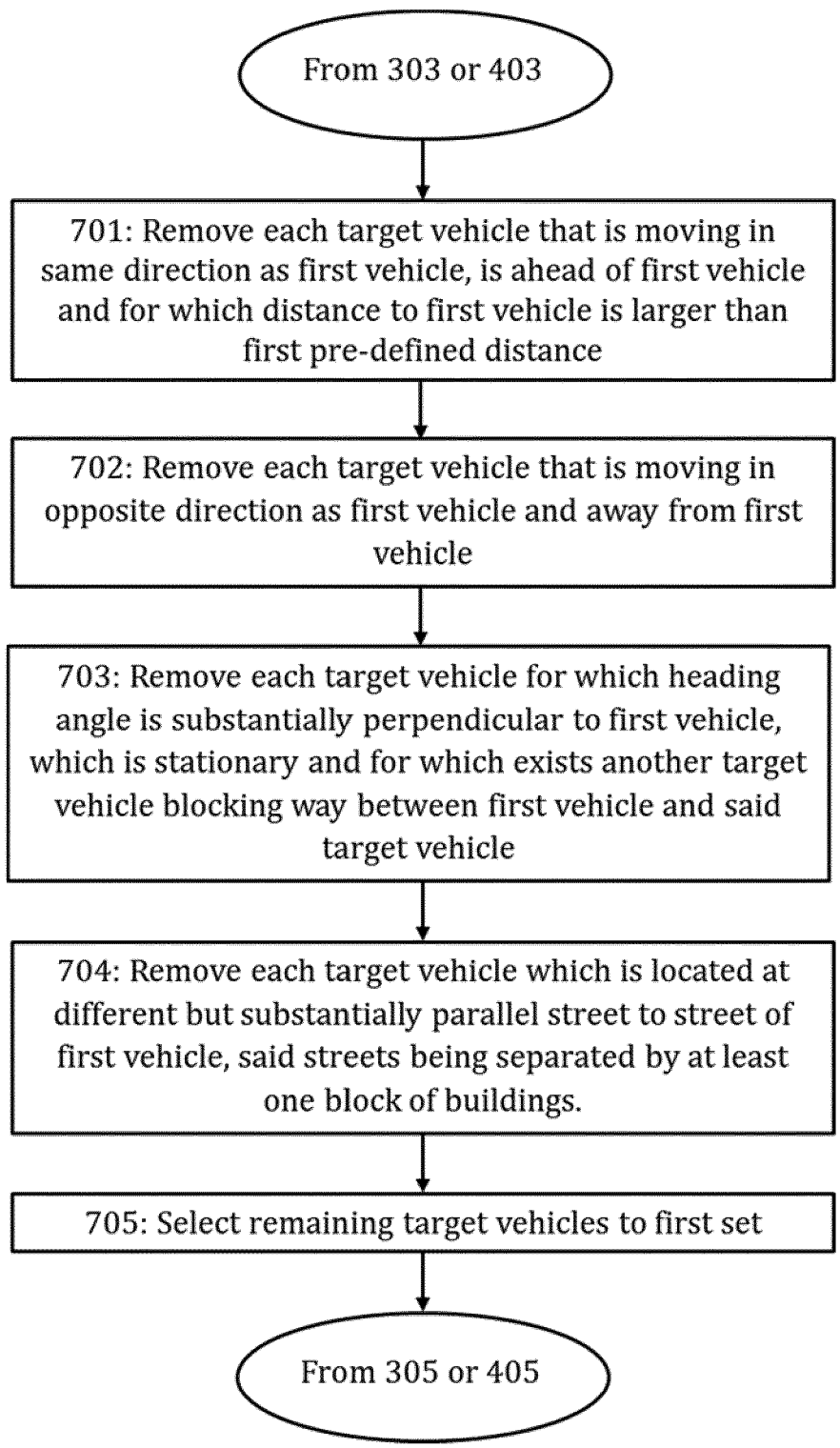

FIG. 7 illustrates a procedure for selecting the first set of one or more target vehicles from the one or more vehicles based on mutual motion context of said vehicles. The one or more vehicles may have been previously selected, e.g., in block 303 of FIG. 3 or block 403 of FIG. 4 based on locations of said vehicles. The illustrated procedure may correspond to block 304 of FIG. 3 or block 404 of FIG. 4.

The vehicular message distribution entity removes, in block 701, each target vehicle which is moving in the same direction (in the same lane or in a parallel lane on the same road) as the first source vehicle but is ahead of the first source vehicle, except for the immediate neighbors (or neighbors in close proximity, e.g., within a few seconds of following time or a few meters of following distance).

The vehicular message distribution entity removes, in block 702, each target vehicle moving in the opposite direction (in a parallel lane on the same road) and is behind the first source vehicle (i.e., the distance is increasing between the vehicles), except for the immediate neighbors (or neighbors in close proximity).

The vehicular message distribution entity removes, in block 703, each target vehicle which fulfils all of the following three criteria:

The target vehicle has a heading angle roughly perpendicular to that of the first source vehicle (i.e., the source and potential target vehicles are located in different non-parallel streets).

The target vehicle is stationary (e.g., waiting in a queue before a red traffic light) or moving away from the closest junction where the roads of the source and target vehicles may collide.

There exists a third vehicle in front of or behind the target vehicle so that the third vehicle is blocking the way between the first source vehicle and the target vehicle (i.e., the first source vehicle could not drive to an adjacent position, before or after, the target vehicle, adhering to all driving rules and regulations, due to the third vehicle being stuck between them).

The first criterion may be checked, for example, by defining one or more threshold values for the (absolute) difference between the heading angles of the first source vehicle and the target vehicle (e.g., threshold values defining a range of allowable angles such as 80° to 100°). Alternatively, one or more threshold values may be defined for the (absolute) difference between said difference between the heading angles and 90° (e.g., a single threshold value defined such as 10°).

The vehicular message distribution entity removes, in block 704, each target vehicle which fulfils both of the following two criteria:

The target vehicle is located (either moving or stationary) in a street different from the first source vehicle and the two streets are roughly parallel (i.e., at least one of the first source vehicle or target vehicle needs to make a turn to make their trajectories potentially crossing).

There is a block of buildings between the aforementioned two streets (i.e., taking away the direct line of sight between the source and potential target vehicles).

After said filtering operations are applied to the one or more vehicles in block 701 to 704, the remaining set of vehicles are selected, in block 705, by the vehicular message distribution entity as the first set of one or more target vehicles.

Figure 8:
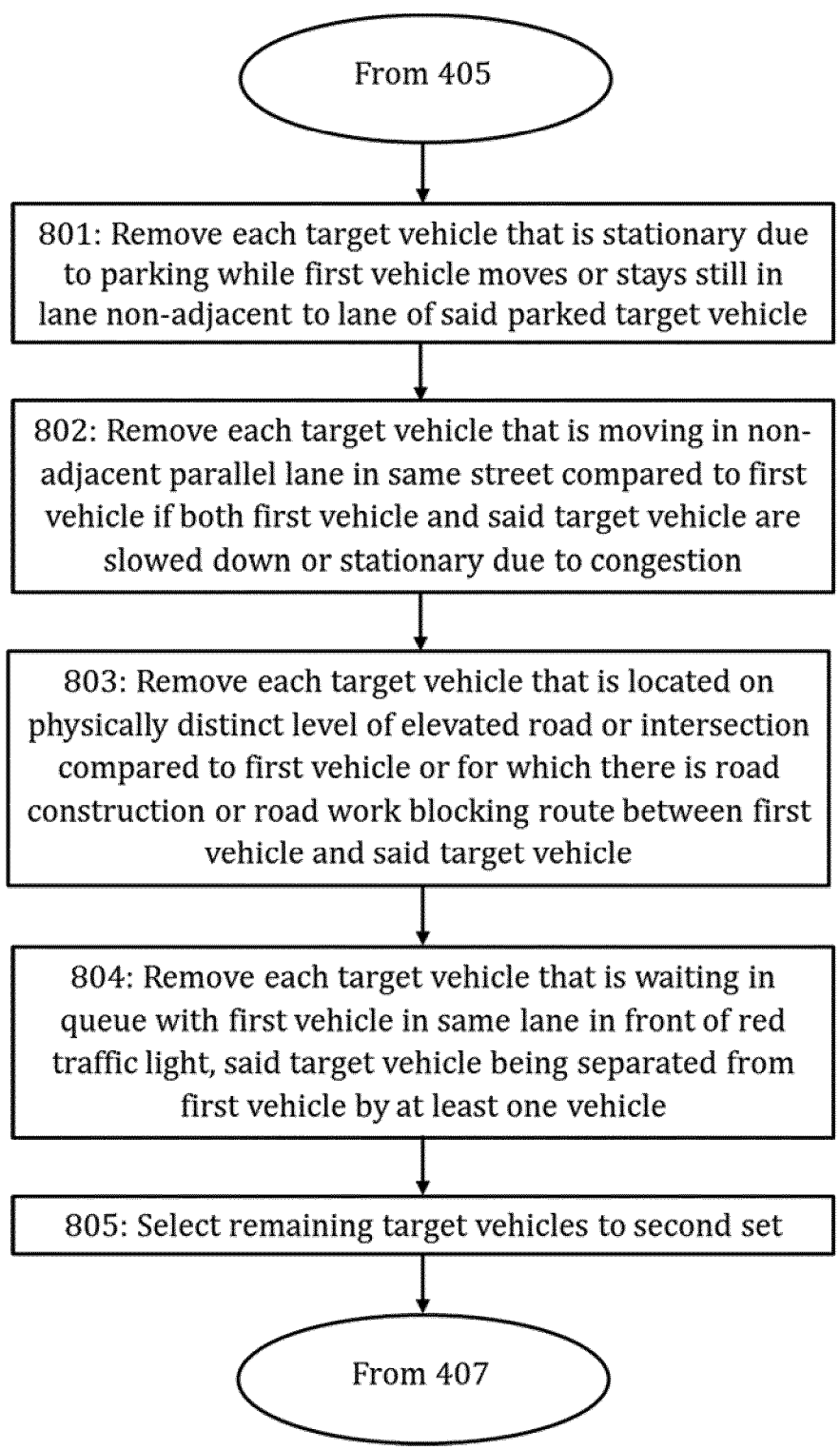

FIG. 8 illustrates a procedure for selecting the second set of one or more target vehicles from the first set of one or more vehicles based on correlation analysis using auxiliary information (in addition to the driving context information and map information). The illustrated procedure may correspond to block 405 and/or block 406 of FIG. 4

Referring to FIG. 8, the vehicular message distribution entity removes, in block 801, from the first set each target vehicle that is stationary due to parking in a parking lane while the first source vehicle moves or remains stationary in a lane non-adjacent to the parking lane.

Then, the vehicular message distribution entity removes, in block 802, from the first set each target vehicle that is moving in a non-adjacent parallel lane in the same street as the first source vehicle if both the first source vehicle and said target vehicle are slowed down or stationary due to traffic congestion (i.e., a traffic jam).

The vehicular message distribution entity removes, in block 803, from the first set each target vehicle fulfilling at least one of the following criteria:

The target vehicle is located on a physically distinct level of elevated road or intersection compared to the first source vehicle.

There is a road construction or road work blocking the (shortest) route between the first source vehicle and the target vehicle.

The vehicular message distribution entity removes, in block 804, from the first set each target vehicle that is waiting in a queue with the first source vehicle (in the same lane as the first source vehicle) in front of a red traffic light if said target vehicle is separated from the first source vehicle by at least one vehicle. After said filtering operations are applied to the first set of one or more vehicles in block 801 to 804, the remaining set of vehicles are selected, in block 805, by the vehicular message distribution entity as the second set of one or more target vehicles.

Figure 9:
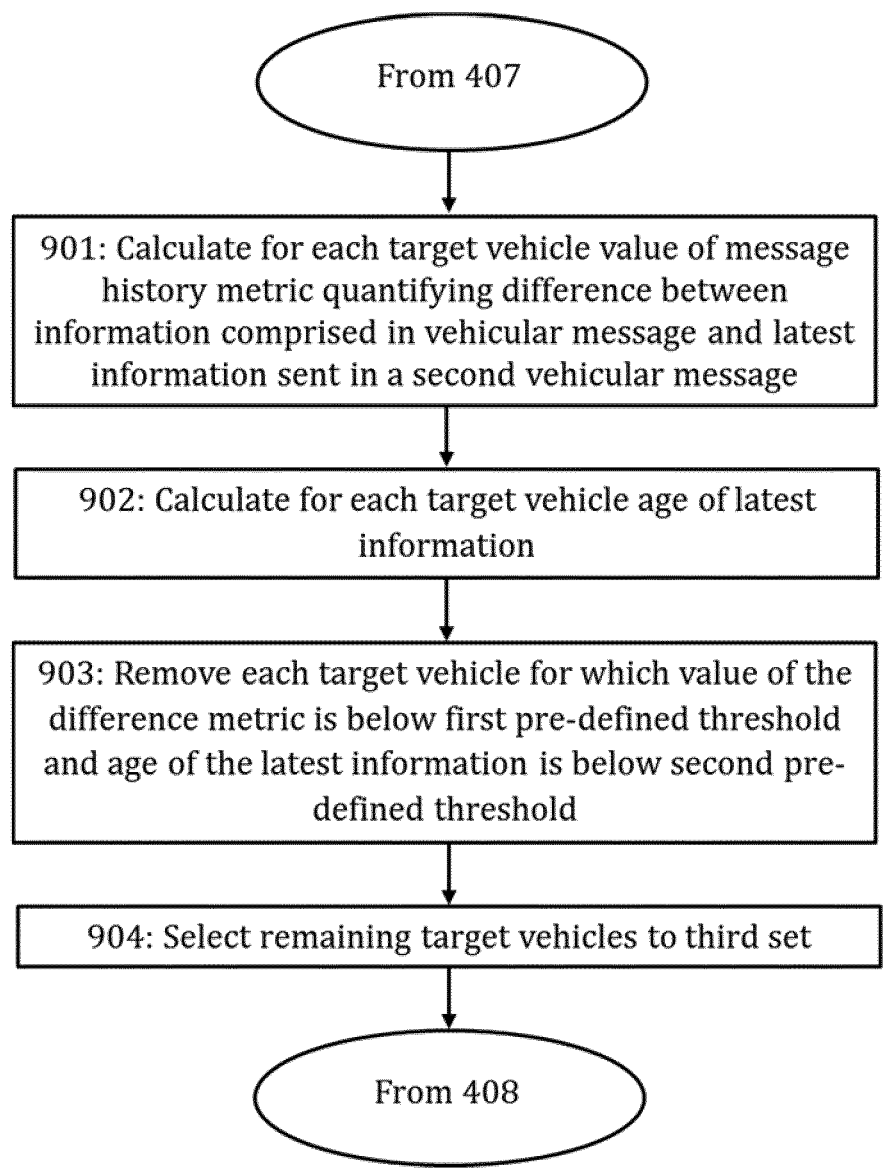

FIG. 9 illustrates a procedure for selecting the third set of one or more target vehicles from the second set of one or more vehicles based on vehicular message priority or importance analytics. The illustrated procedure may correspond to block 407 and/or block 408 of FIG. 4.

Referring to FIG. 9, the vehicular message distribution entity calculates, in block 901, for each target vehicle in the second set a value of a message history metric quantifying a difference between information comprised in the vehicular message and latest information sent in a second vehicular message from the first source vehicle to said target vehicle. The difference quantified by the message history metric may relate to a difference in a kinematic value or to an internal event or a prior indication of an internal event. The kinematic value may describe, for example, one of location, speed and acceleration while the internal event may relate, for example, to a change in trajectory and/or movement of a vehicle. The vehicular message distribution entity calculates, in block 902, for each target vehicle in the second set the age of the latest information. Finally, the vehicular message distribution entity removes, in block 903, each target vehicle from the second set for which the value of the difference metric is below a first pre-defined threshold and the age of the latest information is below a second pre-defined threshold and selects, in block 904, the remaining target vehicles in the second set to the third set of target vehicles. In some embodiments, only one of said criteria may be enforced.

The impact of mobility analytics-based filtering, i.e., filtering corresponding to FIG. 7, is visualized in FIGS. 10A to 10D step by step. The illustration is provided for two different orientations of the source vehicle 1040 ("Source vehicle heading East" and "Source vehicle heading West") in an example scenario that comprises one building block and four traffic lanes on each side with directions indicated by arrows and traffic lights being present in red (blocking) state as indicated by the white line segments. The changes to the set of target vehicles 1050 are indicated in FIGS. 10A to 10D for both source vehicle orientations with the "heading East" orientation corresponding to the top half and the "heading West" orientation to the bottom half of each Figure.

Figure 10A:
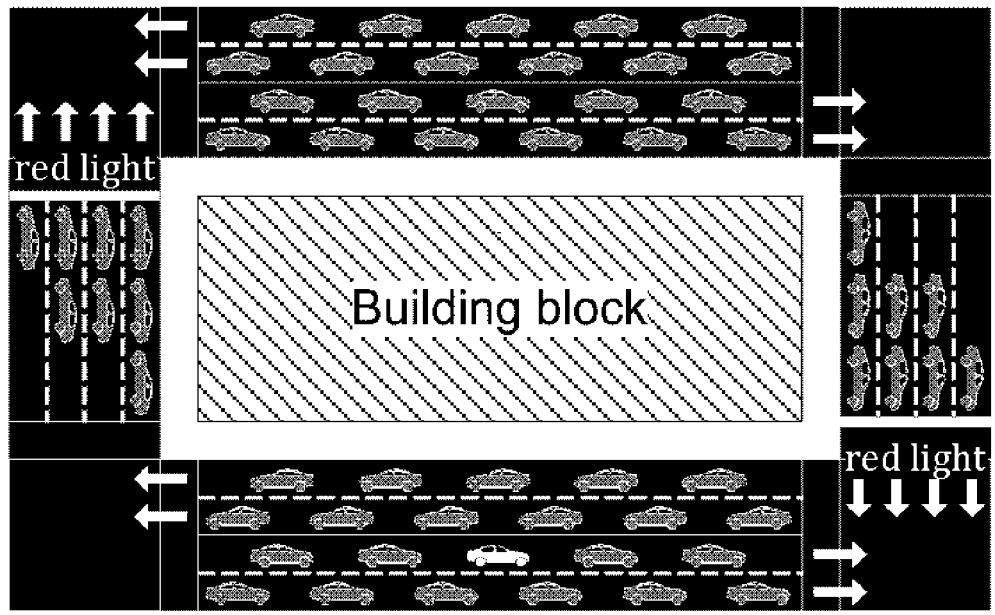
FIGS. 10A to 10D illustrate two examples of applying a method according to embodiments of the invention.
Figure 10A:
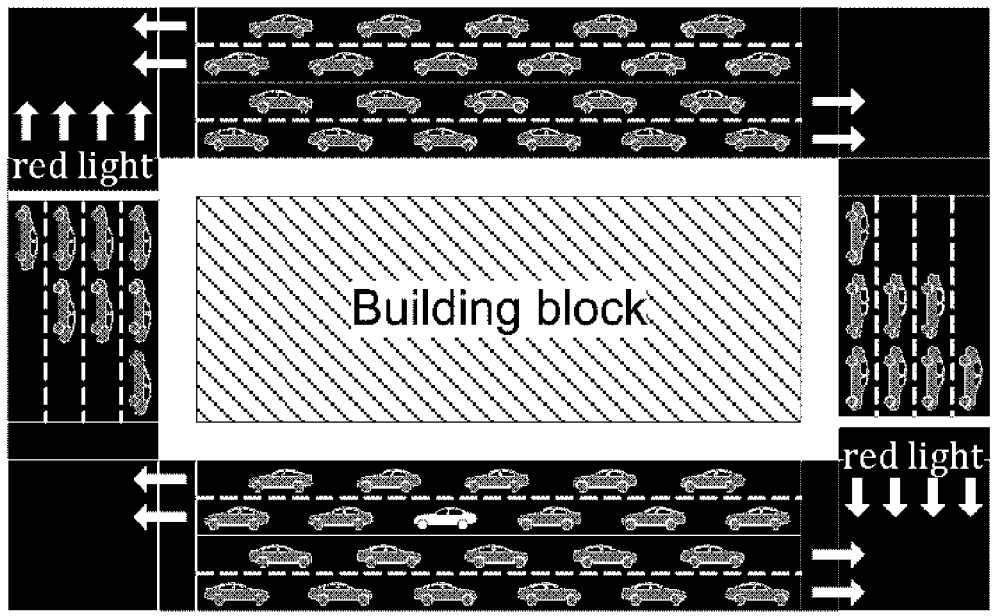

In FIG. 10A, an initial set of vehicles 1050 is compiled considering at least the location of the vehicles. As discussed above, a reasonable implementation is to use a geo-area based selection (e.g., collect potential target vehicles that are within a given distance of the source vehicle). Alternatively, the vehicular message distribution entity may create an initial list that is already more restricted than the geo-area based selection.

Figure 10B:
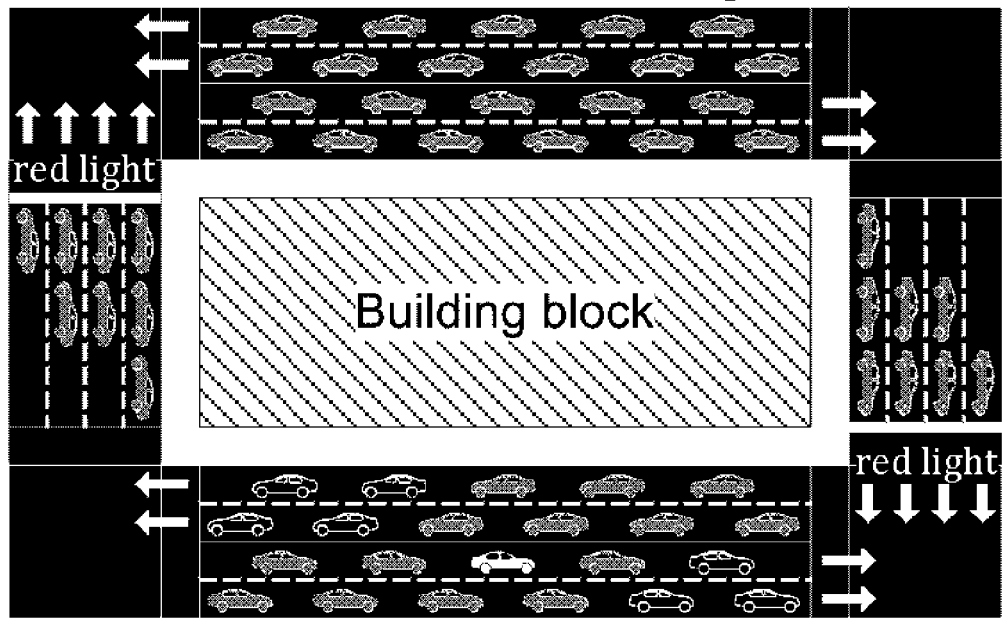
Figure 10B:
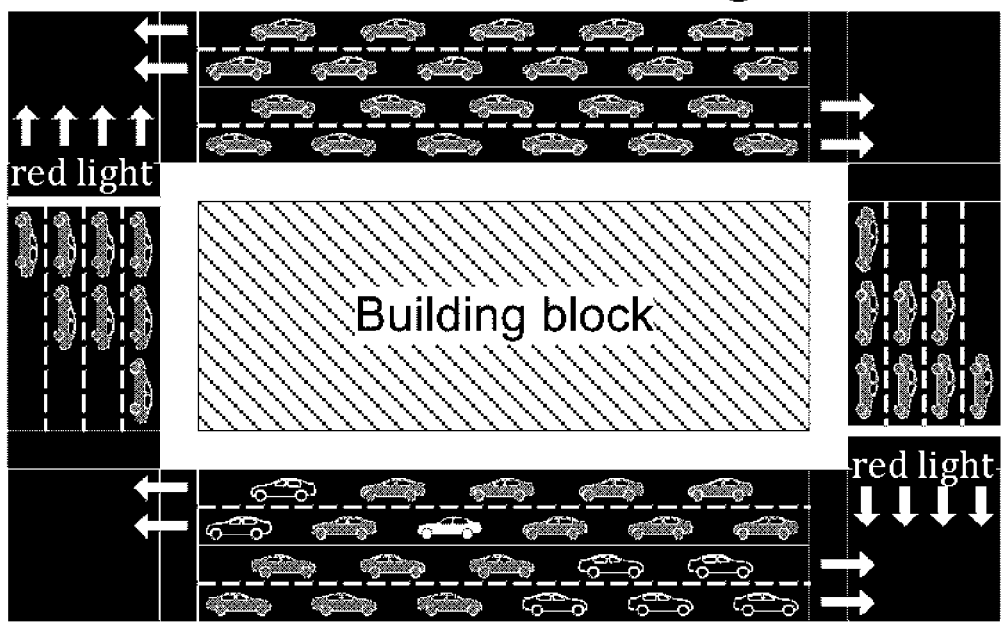

In FIG. 10B, the initial set of target vehicles is filtered by excluding those target vehicles which fulfil the criteria given in block 701 or block 702 of FIG. 7. This action leads to an elimination of multiple target vehicles 1060 on the same street as the source vehicle, namely three target vehicles in front of the source vehicle 1040 and four target vehicles behind the source vehicle 1040 for the source vehicle 1040 heading east and two target vehicles in front of the source vehicle 1040 and five target vehicles behind the source vehicle 1040 for the source vehicle 1040 heading west.

Figure 10C:
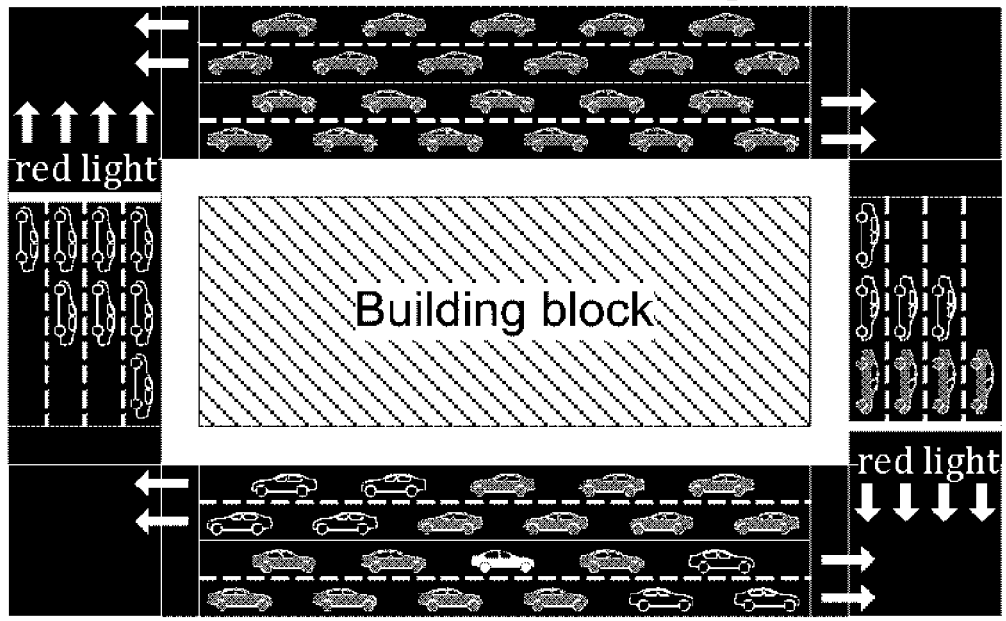
Figure 10C:
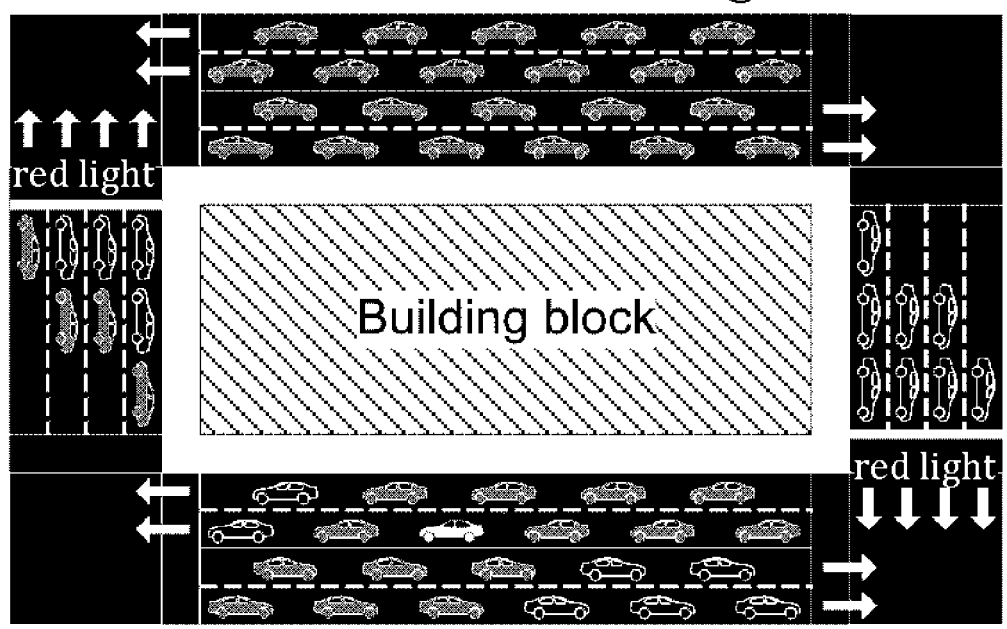

In steps FIG. 10C, the set of target vehicles is further filtered by excluding those target vehicles which fulfil the criteria given in block 703 of FIG. 7. This action leads to an elimination of multiple target vehicles 1060 located on one of the two streets orthogonal to the street of the source vehicle.

Figure 10D:
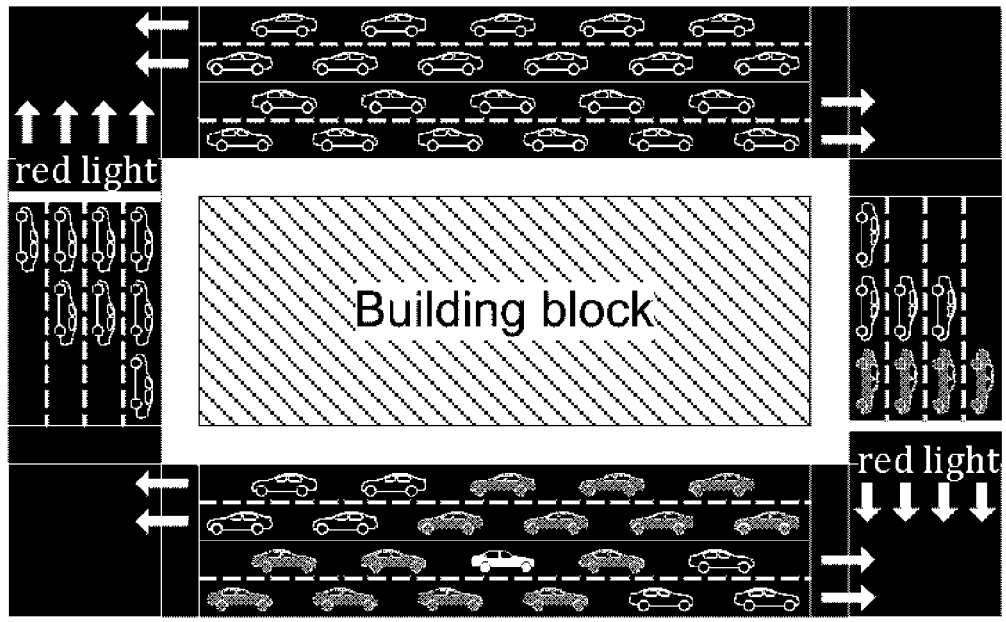
Figure 10D:
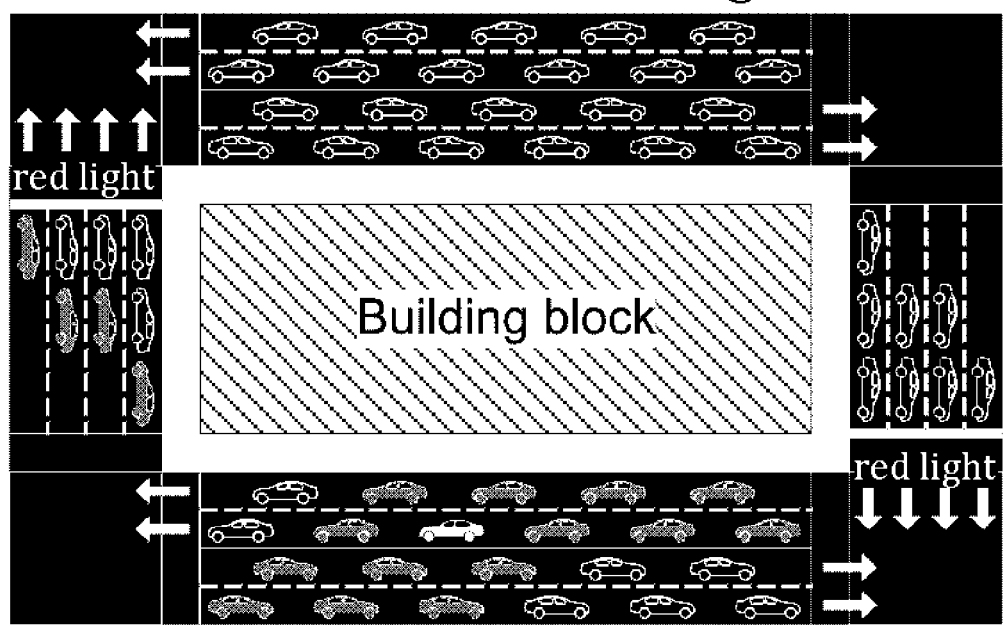

In steps FIG. 10D, the set of target vehicles is filtered a third time by excluding those target vehicles which fulfil the criteria given in block 704 of FIG. 7. This action leads to an elimination of all target vehicles 1060 located on the street parallel to the street of the source vehicle but separated from it by the building block.

It was demonstrated using a simple example that by applying mobility analytics filtering as described in relation to FIG. 7, the number of target vehicles may be radically reduced. In this case, further filtering, for example, based on correlation analysis using auxiliary information and/or on analysis of message history may be applied to reduce the number of target vehicles even further. For example, the three target vehicles in non-adjacent but parallel lanes compared to the source vehicle remaining in FIG. 10D may be filtered out from the selection of target vehicles according to block 802 of FIG. 8.

The embodiments discussed above present multiple benefits compared to earlier solutions. Firstly, amount of resources (radio bandwidth, potentially also transport network bandwidth and computation power) required for completing end-to-end delivery of a vehicular message (i.e., from the source to all eligible receivers) may be considerable reduced while still being able to use the reliable unicast transmission mechanism in downlink. The freed resources may be reused for other services which may lead to improvements, for example, in the QoS/QoE (Quality of Experience) of non-vehicular traffic. Secondly, as the amount of unusable (non-interesting) information delivered to vehicles in vehicular messages may be significantly reduced or eliminated, the amount of resources required for receiving and processing said vehicular messages may also be reduced. This results in more efficient utilization of the vehicle's resources throughout the whole V2X stack (communication chipset, internal message busses, OBU, V2X application layer). Thirdly, QoS for the V2X messages may be improved meaning that information may be received from other vehicles with lower latency. This may enable or improve the quality and efficiency of cooperative driving functions (such as CACC). Fourthly, self-driving or assisted driving functions may be improved as more valuable information in fewer overall messages may be received compared to purely geo-area based delivery. For example, with some embodiments it may be possible to receive information from a vehicle that is outside of all usual geo-areas and distances but carries significant state or information from the receiver's point of view (e.g., knowledge of an accident just happening ahead, out of the reach of any potential geo-area definition, may be used to re-route the vehicle in due time). Finally, privacy may be improved due to reduced scope of information disseminating, that is, messages are delivered only on need to know basis.

The blocks, related functions, and information exchanges described above by means of FIGS. 3 to 9 are in no absolute chronological order, and some of them may be performed simultaneously or in an order differing from the given one.

Figure 11:
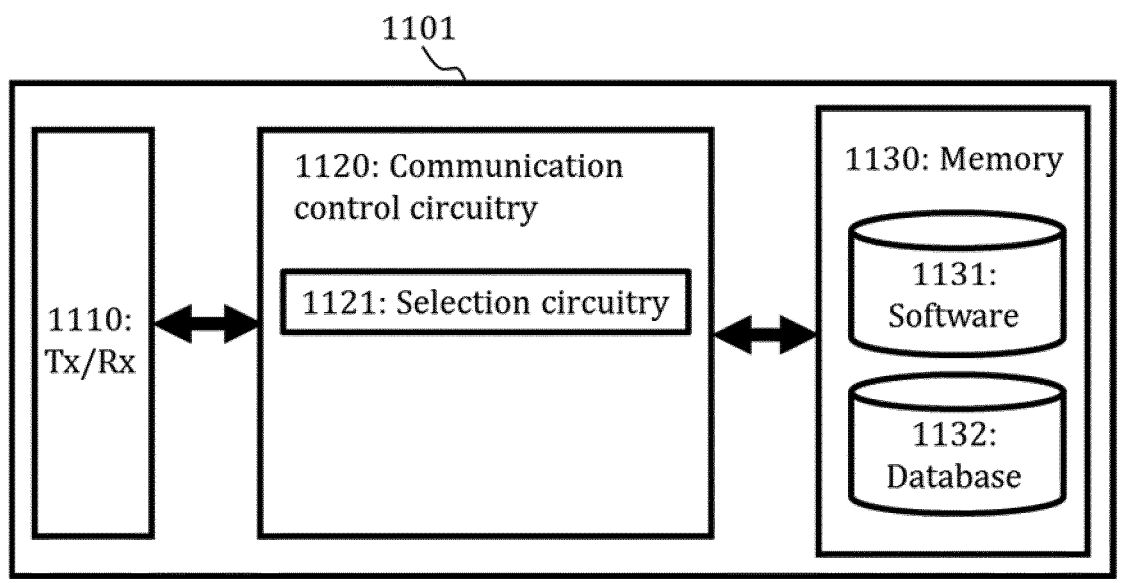
FIGS. 11 and 12 illustrate apparatuses according to embodiments of the invention.

FIG. 11 illustrates an exemplary apparatus 1101 configured to carry out the functions described above in connection with the vehicular message distribution entity. The apparatus may correspond to one of the elements 123, 133, 143 of FIG. 1, to one of the pairs of elements 123 and 124, 133 and 134, 143 and 144 of FIG. 1 and/or to the element 230 of FIG. 2. The apparatus may be an electronic device comprising electronic circuitries. The apparatus may be a separate network entity or a plurality of separate entities. The apparatus may comprise a communication control circuitry 1110 such as at least one processor, and at least one memory 1130 including a computer program code (software) 1131 wherein the at least one memory and the computer program code (software) are configured, with the at least one processor, to cause the apparatus to carry out any one of the embodiments of the vehicular message distribution entity described above.

The memory 1130 may be implemented using any suitable data storage technology, such as semiconductor based memory devices, flash memory, magnetic memory devices and systems, optical memory devices and systems, fixed memory and removable memory. The memory may comprise at least one database 1132 which may correspond to the one or more databases 124, 134, 144 as described in relation to FIG. 1. In some embodiments, the one or more databases 124, 134, 144 of FIG. 1 may comprise one or more separate entities connected to the apparatus 1101, e.g., via a communication interface (Tx/Rx) 1110. The memory 1130 may be connected to the communication control circuitry 1120 via an interface.

The communication interface (Tx/Rx) 1110 may comprise hardware and/or software for realizing communication connectivity according to one or more communication protocols. The communication interface may provide the apparatus with communication capabilities to communicate in the cellular communication system and enable communication with network nodes (e.g., access nodes) and vehicular communication-enabled vehicles comprising vehicular application entities, for example. The communication interface 1110 may comprise standard well-known components such as an amplifier, filter, frequency-converter, (de)modulator, and encoder/decoder circuitries and one or more antennas. The communication interface 1110 may provide the apparatus at least some of the functionalities discussed in relation to FIG. 2.

Referring to FIG. 11, the communication control circuitry 1120 may comprise selection circuitry 1121 configured to select the target vehicles for transmission. The selection circuitry 1121 may be configured to carry out at least some of the processes of FIGS. 3 to 5 and 7 to 9.

Figure 12:
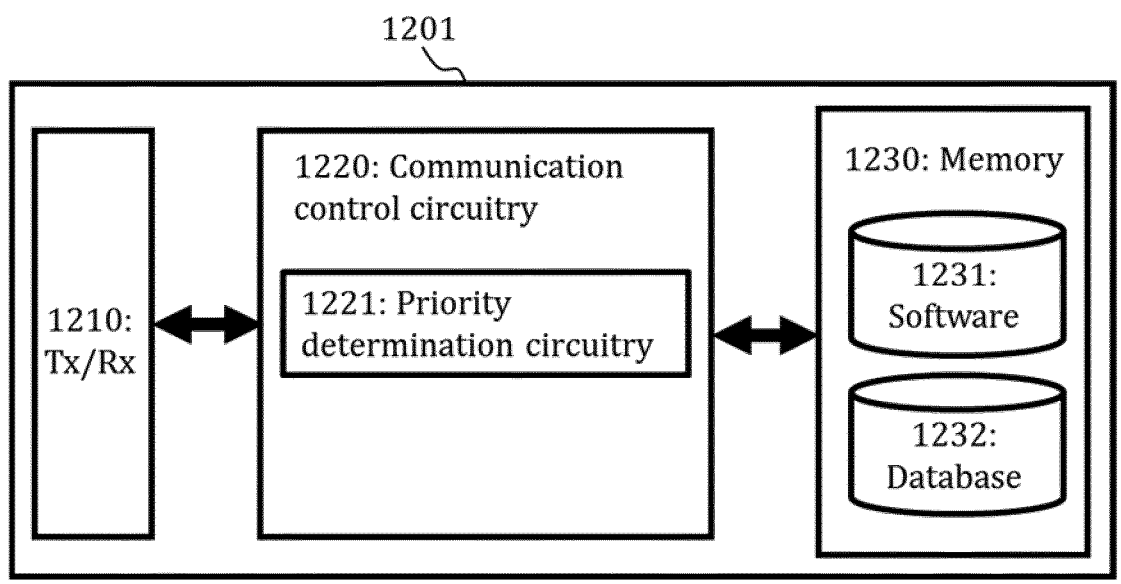

FIG. 12 illustrates an exemplary apparatus 1201 configured to carry out at least some of the functions described above in connection with the vehicular application entity 111, 211 of a vehicular communication-enabled vehicle 110, 150, 160. Specifically, the apparatus is configured to carry out the functions described above for a vehicular application entity which supports the vehicular message format comprising priority level information and/or is able to determine said priority level. The apparatus may comprise not only the vehicular application entity 111 but also the on-board unit 113, the communication module 112 and/or the antenna 114. The apparatus may be an electronic device comprising electronic circuitries. The apparatus may be a separate network entity or a plurality of separate entities. The apparatus may comprise a communication control circuitry 1210 such as at least one processor, and at least one memory 1230 including a computer program code (software) 1231 wherein the at least one memory and the computer program code (software) are configured, with the at least one processor, to cause the apparatus to carry out any one of the embodiments of the with the vehicular application entity described above.

The memory 1230 may be implemented using any suitable data storage technology, such as semiconductor based memory devices, flash memory, magnetic memory devices and systems, optical memory devices and systems, fixed memory and removable memory. The memory may comprise a database 1232. The database may comprise at least information on current use case of the vehicular application entity. The memory 1230 may be connected to the communication control circuitry 1220 via an interface.

The apparatus may further comprise a communication interface (Tx/Rx) 1210 comprising hardware and/or software for realizing communication connectivity according to one or more communication protocols. The communication interface may provide the apparatus with communication capabilities to communicate in the communication system, for example, with access nodes and further with at least one vehicular message distribution entity. The communication interface 1210 may comprise standard well-known components such as an amplifier, filter, frequency-converter, (de)modulator, and encoder/decoder circuitries and one or more antennas.

Referring to FIG. 12, the communication control circuitry 1220 may comprise a priority determination circuitry 1221 configured to determine the priority level of a vehicular message and integrate said priority level information into the vehicular message before it is sent to the vehicular message distribution entity. The priority determination circuitry 1221 may be configured to carry out any of the processes of FIG. 6.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 9 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art. To give an example, the functions of a vehicular application entity as described in FIG. 6 may be implemented as software such that the vehicular application entity may be integrated into the on-board unit of the vehicle.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
 maintaining in a database of a vehicular message distribution entity in a communications system,
 map information,
 driving context information of a plurality of vehicles, wherein the driving context information of each vehicle of the plurality of vehicles comprises at least information for determining a geographical location and a short-term trajectory of said vehicle; and
 message history information for each vehicle pair formed by a first source vehicle and a target vehicle of the plurality of vehicles,
 receiving, in the vehicular message distribution entity, from the first source vehicle a vehicular message comprising at least driving context information of the first source vehicle;
 selecting, by the vehicular message distribution entity, a first set of target vehicles in proximity of the first source vehicle from the plurality of vehicles based on geographical locations of the first source vehicle and the plurality of vehicles;
 selecting, by the vehicular message distribution entity, a second set of one or more target vehicles from the first set of target vehicles based on
 the driving context information of the first source vehicle,
 driving context information of the first set of target vehicles, and
 the map information;
 analyzing, by the vehicular message distribution entity, message history information relating to the first source vehicle and the second set of one or more target vehicles to determine values of one or more message history metrics;
 selecting, by the vehicular message distribution entity, a third set of one or more target vehicles from the second set based on the values of the one or more message history metrics; and
 causing, by the vehicular message distribution entity, sending the vehicular message to the one or more target vehicles in the third set using unicast transmission.

2. The method according to claim 1, wherein the one or more vehicles are selected from the plurality of vehicles based on a geographical area surrounding a geographical location of the first source vehicle.

3. The method according to claim 1, further comprising:
 storing, by the vehicular message distribution entity, the vehicular message or a timestamp of the receiving the vehicular message to the database.

4. The method according to claim 1, further comprising:
 maintaining, in the database of the vehicular message distribution entity, auxiliary information received from one or more sources of one or more of the following types: a smart city infrastructure sensor, an Internet of Things network, a mobile broadband traffic of a vehicular user, a road sensor, a weather sensor, a weather forecast entity and a road camera; and before the sending of the vehicular message, performing, by the vehicular message distribution entity, the following:

analyzing the driving context information of the first source vehicle against driving context information of one or more target vehicles taking into account auxiliary information relating to the first source vehicle and the one or more target vehicles and the map information;

selecting a fourth set of one or more target vehicles from the second set of one or more target vehicles based on the analyzing; and performing the analyzing of the message history information only for message history information relating to the first source vehicle and the fourth set of one or more target vehicles and the selecting of the third set of one or more target vehicles only from the fourth set of one or more target vehicles.

5. The method according to claim 4, further comprising:
in response to the analyzing, storing, by the vehicular message distribution entity, results of the analyzing to the database.

6. The method according to claim 4, wherein the selecting of the fourth set of one or more target vehicles comprises selecting one or more target vehicles remaining after filtering the second set of one or more target vehicles according to one or more of the following:

removing each target vehicle that is stationary due to parking in a parking lane while the first source vehicle moves or remains stationary in a lane non-adjacent to the parking lane;

removing each target vehicle that is moving in a non-adjacent parallel lane in the same street compared to the first source vehicle if both the first source vehicle and said target vehicle are slowed down or stationary due to traffic congestion;

removing each target vehicle that is located on a physically distinct level of elevated road or intersection compared to the first source vehicle or for which there is a road construction or road work blocking the route between the first source vehicle and said target vehicle; and removing each target vehicle that is waiting in a queue with the first source vehicle in the same lane in front of a red traffic light, said target vehicle being separated from the first source vehicle by at least one vehicle.

7. The method according to claim 1, wherein the one or more message history metrics quantify the change in information carried in one or more consequent vehicular messages for a vehicle pair or temporal distribution of said one or more consequent vehicular messages.

8. A method according to claim 1, further comprising, before the sending:

mapping, by the vehicular message distribution entity, a message history metric of the one or more message history metrics to a Quality of Service priority for the vehicular message; and creating, by the vehicular message distribution entity, one or more copies of the vehicular message, wherein each copy comprises information on the Quality of Service priority for a corresponding target vehicle as a Quality of Service priority field in a protocol data unit used for transferring vehicular messages; and causing the sending according to Quality of Service priority fields of the one or more copies of the vehicular message and other vehicular messages waiting to be sent.

9. A method according to claim 1, further comprising, before the sending:

mapping, by the vehicular message distribution entity, a priority level comprised in a header of a protocol data unit of the vehicular message to a Quality of Service priority;

creating, by the vehicular message distribution entity, one or more copies of the vehicular message, wherein each copy comprises information on the Quality of Service priority as a Quality of Service priority field in a protocol data unit used for transferring vehicular messages; and causing the sending according to Quality of Service priority fields of the one or more copies of the vehicular message and other vehicular messages waiting to be sent.

10. The method according to claim 1, wherein the selecting of the second set of one or more target vehicles comprises selecting one or more target vehicles remaining after filtering the one or more vehicles according to one or more of the following:

removing each target vehicle that is moving in the same direction as the first source vehicle, is ahead of the first source vehicle and for which a distance to the first source vehicle is larger than a first pre-defined distance;

removing each target vehicle that is moving in the opposite direction as the first source vehicle and away from the first source vehicle;

removing each target vehicle for which a heading angle is substantially perpendicular to the first source vehicle, which is stationary and for which exists another target vehicle blocking the way between the first source vehicle and said target vehicle; and removing each target vehicle which is located at a different but substantially parallel street to a street of the first source vehicle, said streets being separated by at least one block of buildings.

11. The method according to claim 1, wherein the selecting of the third set comprises selecting one or more target vehicles remaining after filtering a corresponding previous set according to the following:

calculating for each target vehicle available for the selecting a value of the message history metric quantifying a difference between information comprised in the vehicular message and latest information sent in a second vehicular message from the first source vehicle to said target vehicle;

calculating for each target vehicle available for the selecting age of the latest information; and removing each target vehicle available for the selecting for which the value of the difference metric is below a first pre-defined threshold and the age of the latest information is below a second pre-defined threshold.

12. The method according to claim 11, wherein the difference quantified by the message history metric relates to a difference in a kinematic value or to an internal event or a prior indication of an internal event, kinematic value describing one of location, speed and acceleration, the internal event relating to a change in trajectory or movement of a vehicle.

13. An apparatus, comprising:
at least one processor, and at least one memory for storing instructions to be executed by the processor, wherein the at least one memory and the instructions are configured to, with the at least one processor, cause the apparatus to perform the method according to claim 1.

14. The apparatus according to claim 13, wherein the apparatus comprises a vehicular message distribution entity located in one of the following: a radio cloud or an edge cloud of a radio access network of the communications system, a core cloud a core network of the communications system and an over-the-top cloud in a public data network of the communications system.

15. A system, comprising:
one or more vehicular message distribution entities in a communications system configured to perform the method according to claim 9; and
one or more vehicular application entities in one or more vehicles, connected to at least one of the one or more vehicular message distribution entities via the communications system, each vehicular application entity being configured to perform the following:
maintaining, in a memory of a vehicular application entity of a vehicle in a communications system, information on a current use case of the vehicular application entity for vehicular communication;
determining, by the vehicular application entity, a priority level for vehicular communication based at least on the information on the current use case; and
causing, by the vehicular application entity, sending a vehicular message comprising information on the priority level in a header of a protocol data unit of the vehicular message and driving context information of the first source vehicle to the vehicular message distribution entity for further transmission to one or more target vehicles, the driving context information comprises at least information for determining a geographical location and a short-term trajectory of the first source vehicle.

16. The system according to claim 15, each vehicular application entity being further configured to perform the following:
receiving, in the vehicular application entity via the communications system, information on current traffic situation concerning the vehicle; and
using the information on the current traffic situation concerning the vehicle also in the determining the priority level.

17. A non-transitory computer readable medium having stored thereon instructions that, when executed by a computing device, cause the computing device to perform the method according to claim 1.

* * * * *